(12) United States Patent
Rodrigues et al.

(10) Patent No.: US 8,540,741 B2
(45) Date of Patent: Sep. 24, 2013

(54) WEASAND-LIGATING CLIP

(75) Inventors: Mario Rodrigues, Coulaines (FR); Cédric Pigeon, Le Bailleul (FR)

(73) Assignee: Termet Solefi, Champagne (FR)

( * ) Notice: Subject to any disclaimer, the term of this patent is extended or adjusted under 35 U.S.C. 154(b) by 0 days.

(21) Appl. No.: 13/126,459

(22) PCT Filed: Oct. 28, 2009

(86) PCT No.: PCT/IB2009/054768
§ 371 (c)(1),
(2), (4) Date: Sep. 20, 2011

(87) PCT Pub. No.: WO2010/049894
PCT Pub. Date: May 6, 2010

(65) Prior Publication Data
US 2012/0004679 A1    Jan. 5, 2012

(30) Foreign Application Priority Data

Oct. 28, 2008  (FR) ...................................... 08 57328

(51) Int. Cl.
*A61B 17/08* (2006.01)
(52) U.S. Cl.
USPC ........................................... 606/157; 383/69
(58) Field of Classification Search
USPC ................... 606/151, 153, 155–158; 24/336, 24/339, 42, 61.1, 61.2, 63, 64, 65, 68, 69, 24/78, 81, 84; 452/176; 70/64–66; 383/64, 383/68, 69; 251/4, 7, 9, 10
See application file for complete search history.

(56) References Cited

U.S. PATENT DOCUMENTS

| | | | |
|---|---|---|---|
| 3,854,482 A | 12/1974 | Laugherty et al. | |
| 4,988,355 A * | 1/1991 | Leveen et al. | 606/158 |
| 5,423,831 A | 6/1995 | Nates | |
| 5,613,655 A | 3/1997 | Marion | |
| 5,713,912 A | 2/1998 | Porter | |
| RE36,720 E * | 5/2000 | Green et al. | 606/151 |
| 6,190,249 B1 * | 2/2001 | Karubian | 452/176 |
| 6,280,310 B1 | 8/2001 | Landel | |
| 2003/0229368 A1 * | 12/2003 | Viola | 606/158 |
| 2006/0282104 A1 * | 12/2006 | Williamson et al. | 606/151 |

FOREIGN PATENT DOCUMENTS

| | | |
|---|---|---|
| AU | 38 423-78 A | 1/1980 |
| EP | 1 027 830 A1 | 8/2000 |
| NZ | 184817 | 12/1980 |
| WO | WO 03/030758 | 4/2003 |

OTHER PUBLICATIONS

International Search Report in International Application PCT/IB2009/054768, dated Mar. 1, 2010.

(Continued)

*Primary Examiner* — Corrine M McDermott
*Assistant Examiner* — Robert Lynch
(74) *Attorney, Agent, or Firm* — O'Brien Jones, PLLC

(57) ABSTRACT

A weasand-ligating clip (10) made as a one-piece molding, the clip comprising two portions (11) hinged together at one end by a film hinge (13), and including a closure system (15, 16) at the other end, the portions (11) having teeth that clamp against the weasand when the clip is closed, the clip being characterized by the fact that a major longitudinal dimension (L) of the clip measured from the film hinge to the closure system is less than 45 mm, or indeed less than 42 mm, and better less than 40 mm.

20 Claims, 4 Drawing Sheets

(56) References Cited

OTHER PUBLICATIONS

Preliminary Search Report and Opinion issued by French Patent Office in priority application, FR 0857328, having a mailing date of Feb. 2, 2009.

International Written Opinion in International Application PCT/IB2009/054768.
Preliminary Report on Patentability dated May 31, 2011 in International Application PCT/IB2009/054768.

* cited by examiner

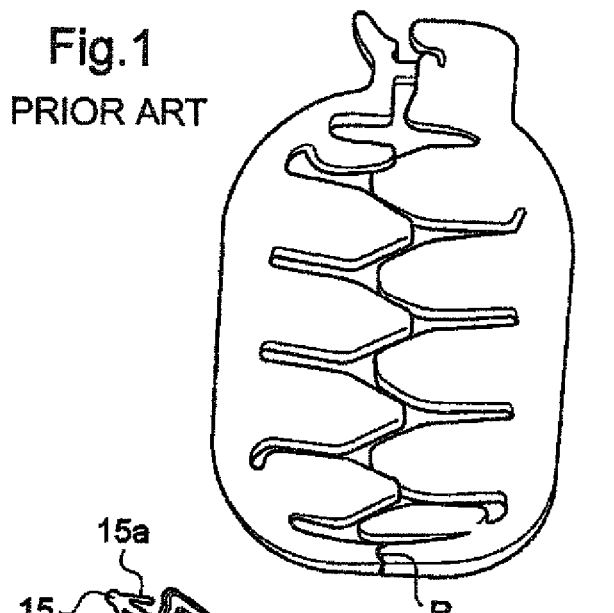
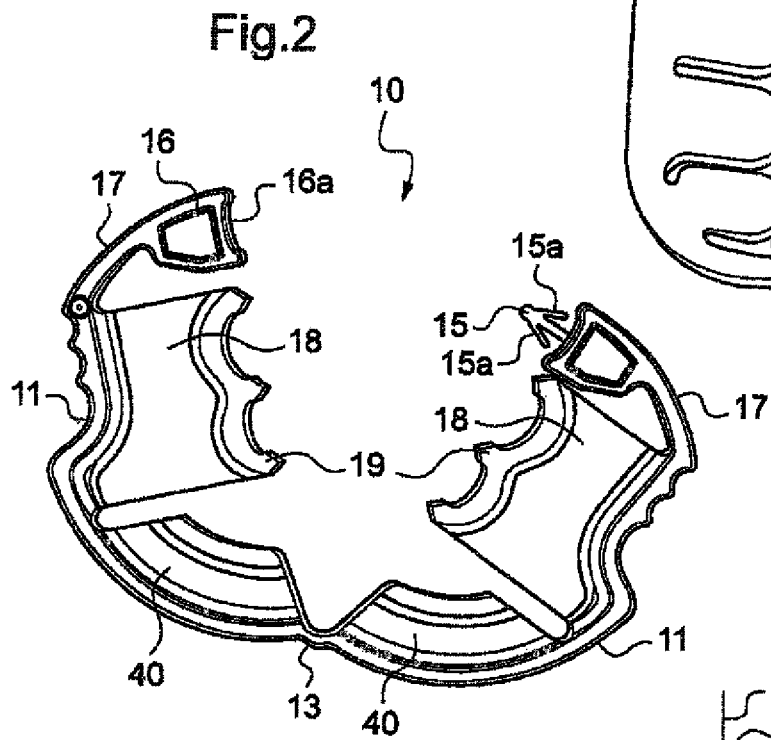
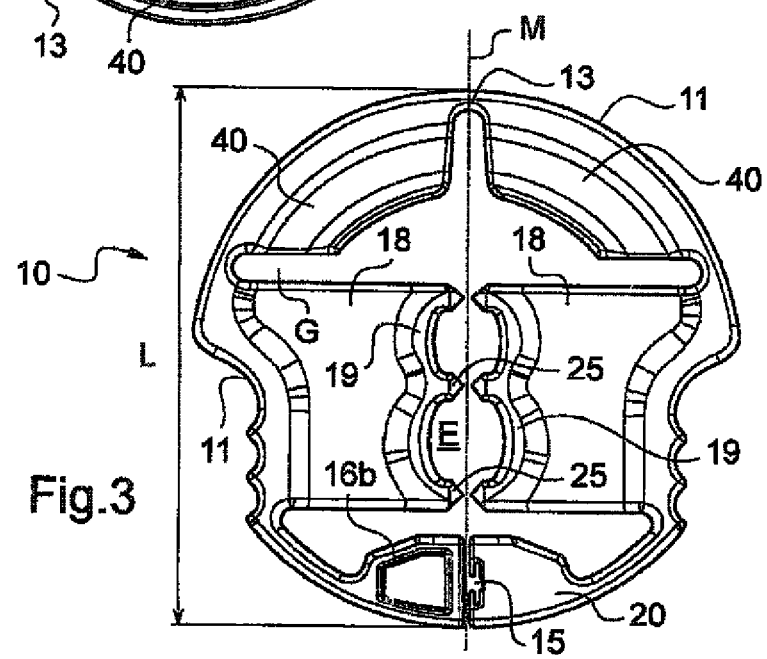

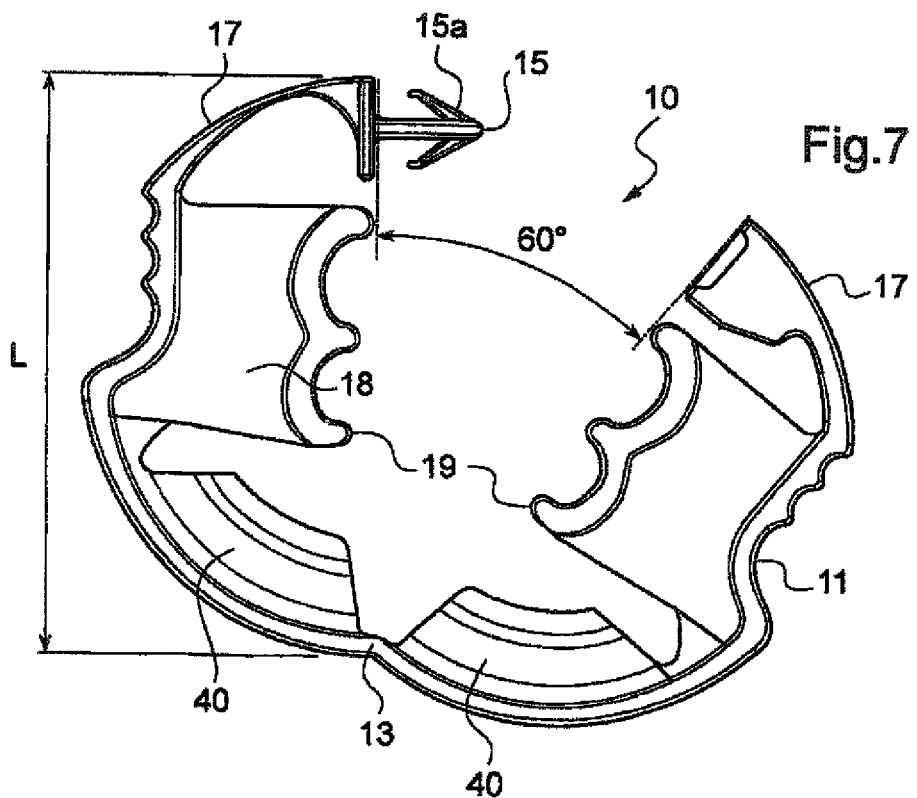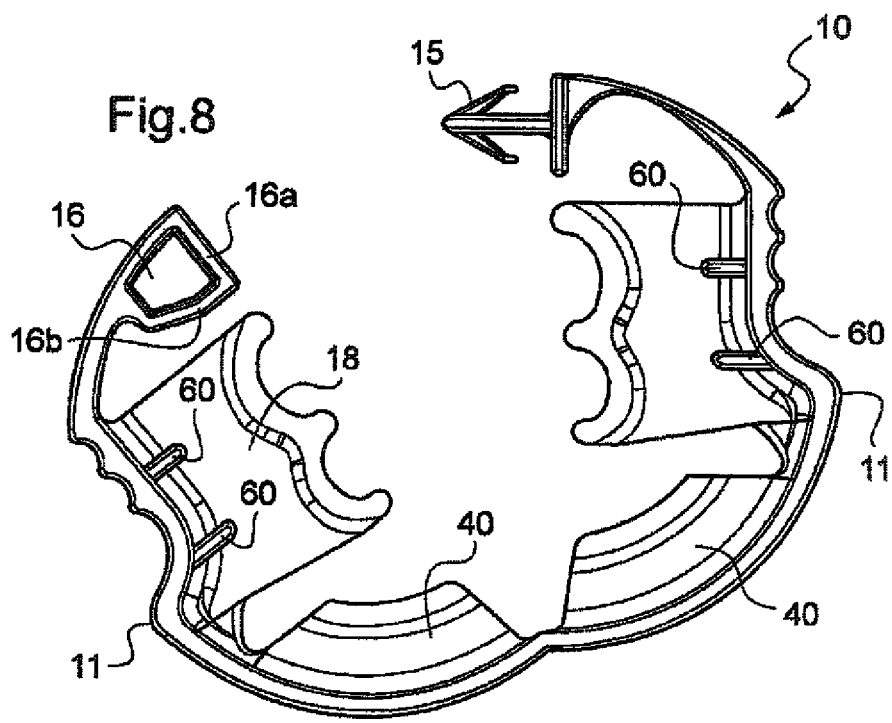

WEASAND-LIGATING CLIP

This is a national stage application of PCT/IB2009/054768, filed internationally on Oct. 28, 2009, which claims priority to French Application No. 0857328, filed on Oct. 28, 2008.

The present invention relates to a weasand-ligating clip.

Clips for ligating the weasand are used in slaughterhouses to close the weasand and prevent the content of the rumen spilling out when the weasand is cut.

Known clips, e.g. as disclosed in AU 38 423-78 or NZ 184817 generally comprise two portions connected together by a film hinge at one end and provided at the other end with a closure system. The closure system projects outside from the two portions, and for example comprises a spear on one of the portions arranged to snap-fasten in a housing formed in the other portion. The two portions carry teeth that are formed on tabs that extend obliquely rearwards.

In known clips, the rows of teeth interpenetrate, and all of the teeth extend in the same direction.

That gives rise to a relatively high scraping force between the clip and the weasand, and known clips thus require considerable force to be applied to them in order to make them slide along the weasand.

The present invention seeks to further improve weasand-ligating clips.

The invention thus provides a weasand-ligating clip made as a one-piece molding, the clip comprising two portions hinged together at one end by a film hinge, and including a closure system at the other end, the portions having teeth that clamp against the weasand when the clip is closed, a major longitudinal dimension of the clip measured from the film hinge to the closure system being less than 45 millimeters (mm), or indeed less than 42 mm, and better less than 40 mm.

The major longitudinal dimension is the outside dimension of the clip, including the film hinge and the closure system.

The small size of the clip reduces the thrust force needed to put into place and reduces the risk of catching on surrounding tissue.

The clip is shaped to be capable of sliding along the weasand, in particular in a single direction, i.e. the force required to make it slide in one direction is different from the force required to make it slide in the opposite direction.

A major transverse dimension of the clip may be greater than 30 mm, or indeed greater than 35 mm, and/or less than 45 mm, e.g. being of the order of about 40 mm. This major transverse dimension is measured perpendicularly to the major longitudinal dimension.

The aspect ratio of the clip, corresponding to the ratio of its major transverse dimension over its major longitudinal dimension may be greater than 0.6, indeed greater than 0.7, than 0.8, than 0.9, or better still greater than 1, or even greater than 1.1. The clip is thus of a shape that makes it easier to slide along the weasand.

The closure system may be located inside the two portions of the clip, thus not projecting outwards.

When observed in face view, the clip may present an enlargement of each of its portions above a grip surface of the clip and against which the user may place the fingers in order to close the clip. This grip surface may be fluted. This facilitates handling and closing the clip. The grip surfaces of each of the portions are not located directly on the closure system, which may thus be free from any projecting tongue.

When the clip is closed, the two portions may define an inside space for receiving the weasand. This space serves to avoid expelling the weasand towards the closure system while the clip is closed. The space may be arranged at least in part between the teeth, e.g. between two successive teeth on one tab and/or between two opposite teeth, each disposed on a respective one of the two portions of the clip.

The section defined by this space when the clip is observed flat and from above, is advantageously greater than 0.5 square centimeters ($cm^2$) in order to be sufficient for receiving the empty weasand as compacted between the teeth.

The teeth closer to the hinge may be spaced further apart from each other than the teeth further away from the hinge.

The invention thus makes it possible to provide dead spaces suitable for receiving the weasand in part. Nevertheless, the presence of these dead spaces does not prevent the teeth from exerting pressure on the weasand and from having a non-return effect.

When the clip is closed, the minimum gap between the two teeth belonging respectively to the two portions may for example lie in the range 0 mm to 5 mm.

When the clip is closed, a first gap between two facing teeth may be smaller than a second gap between two other facing teeth.

Two other facing teeth, other than the teeth defining the first and second gaps, may define a third gap that is greater than the first and second gaps.

Each portion may have at least five teeth facing the other portion. The teeth of one portion may be situated exactly facing the teeth of the other portion when the clip is closed, or they may be offset.

Two adjacent teeth of one portion may be connected together by an edge that is concave towards the other portion. The space between the two facing edges of the hinged portions may increase on going away from the closure system, thereby tending to avoid expelling the weasand while the clip is being closed, so as to prevent the weasand from occupying a position in front of the closure system.

The two portions carry support tabs having teeth formed thereon. Each portion may for example have one to three such support tabs carrying teeth.

The number of teeth per tab may for example lie in the range 1 to 5, better in the range 2 to 5. Each portion may have three teeth, for example.

The support tabs may be directed obliquely towards the rear relative to the direction in which the clip slides on the weasand. The support tabs may bend when the teeth are pushed back by the weasand. The inclination of the support tabs tends to prevent the clip from moving back down after it has been moved up towards the rumen.

The clip may include at least one additional tab, or indeed two additional tabs, that are directed obliquely towards the rear, one on each of its portions, between the support tab carrying the teeth and the film hinge. Such an additional tab tends to push the weasand between the teeth. Such an additional tab need not have any teeth. The additional tabs serve to exert pressure on the weasand but they are not aggressive and therefore they serve to reduce the force required to move the clip along the weasand. They may be relatively rigid. They also contribute to sliding of the clip with a non-return effect, and to reducing the size of the clip.

A tooth-supporting tab and an additional tab exert thrust in different directions on the clip.

On its outside surface, when the clip is closed and observed from above, it may be seen to be lacking any closure system that projects. This serves, when the clip is moved along the weasand, to avoid catching on surrounding tissue, and thus to avoid any risk of damaging the clip and the tissue, and this also serves to reduce the force required to put the clip in place. The closure system may be located inside the clip.

The closure system may close in non-releasable manner.

The weight of the clip may be less than or equal to 4 grams (g). The invention enables a clip to be made that is both effective and inexpensive, since it comprises relatively little material. The clip may be molded out of a polyolefin, e.g. polypropylene. The use of such a material is made possible by the shape-related stiffness of the clip. The relatively short teeth are compatible with the use of such a material, which is not true of prior art clips, so far as the Applicant is aware.

The clip may be made by bi-injection of plastics materials, which materials may include at least one ferromagnetic element, e.g. close to the closure system.

The clip may be packaged in non-sterile manner.

In another of its aspects, the invention also provides a weasand-ligating clip made as a one-piece molding, the clip comprising two portions hinged together at one end by a film hinge, and including a closure system at the other end, the portions having teeth that clamp against the weasand when the clip is closed, the two portions defining, when the clip is closed, an inside space for receiving the weasand, the closure system being incorporated in the clip and not projecting to the outside. Such a clip thus has no projecting tongue.

The invention also provides a weasand-ligating clip made as a one-piece molding, the clip comprising two portions hinged together at one end by a film hinge, and including a closure system at the other end, the portions having teeth that clamp against the weasand when the clip is closed, the clip comprising at least two elements configured to push the weasand in different directions once the clip is closed, i.e. towards the midplane and substantially perpendicularly thereto, for one of the elements, and in a direction at a non-zero angle with the first, e.g. of more than 30°, for the second of the elements.

By way of example, the first element is the tab supporting the teeth as defined above, and the second element is the above-mentioned additional tab.

In another of its aspects, the invention provides a weasand-ligating clip made as a one-piece molding, the clip comprising two portions hinged together at one end by a film hinge, and including a closure system at the other end, the portions having teeth that clamp against the weasand when the clip is closed, said teeth being spaced apart from a midplane of the clip when the clip is closed, or projecting beyond the midplane by a distance that is less than or equal to 2 mm, in particular when the teeth are mutually offset. The gap between the teeth or their small degree of interpenetration reduces the forces that need to be exerted on the weasand and make it easier to slide the clip.

In another of its aspects, the invention also provides a method of ligating the weasand of a ruminant, a bovine or an ovine, wherein the above-defined clip is used by being caused to slide along the weasand towards the rumen.

The dimensions of the clip may be adapted as a function of the animal, a bovine or an ovine. For a bovine, the dimensions of the clip may be as defined above. For an ovine, they may be proportionally slightly smaller, given the smaller size of ovines compared with bovines.

The invention can be better understood on reading the following detailed description of a non-limiting embodiment of the invention and on examining the accompanying drawings, in which:

FIG. 1 is a plan view of an example of a prior art clip;

FIGS. 2 and 3 are plan views of a clip made in accordance with the invention, respectively before and after closure;

FIG. 7 is a plan view of a variant embodiment;

FIG. 8 is a view from beneath the clip of FIG. 7; and

Figure 4:
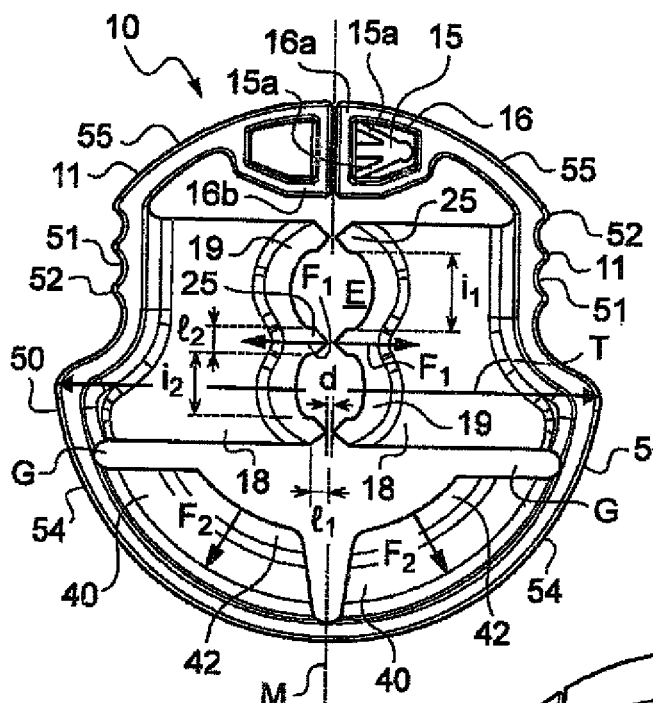
FIG. 4 is a rear view of the clip of FIGS. 2 and 3.
Figure 5:
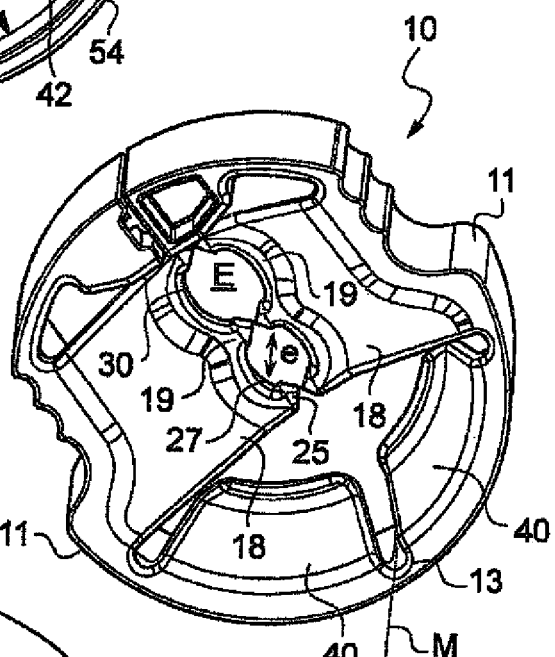
FIGS. 5 and 6 are perspective views of the clip of FIGS. 2 to 4.
Figure 6:
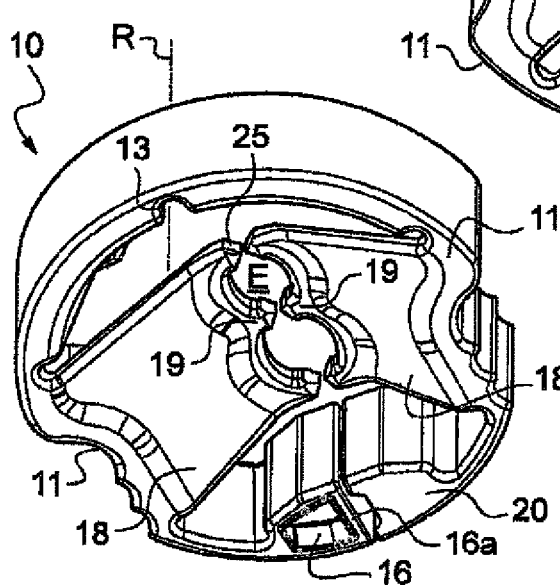
Figure 9:
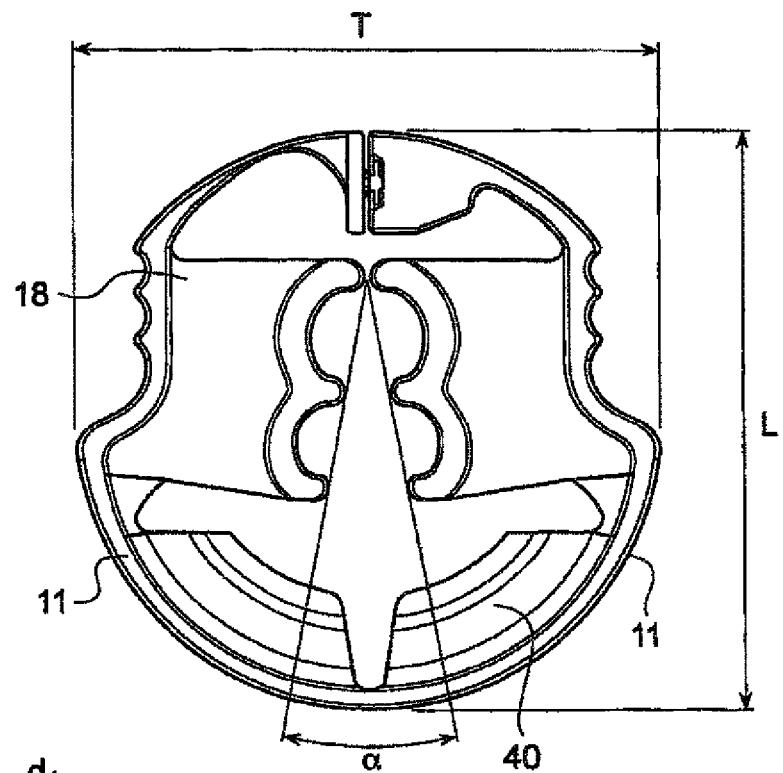
Figure 9A:
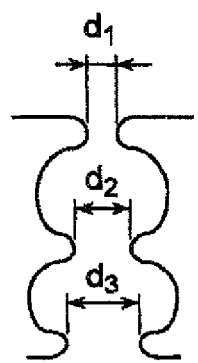
Figure 10:
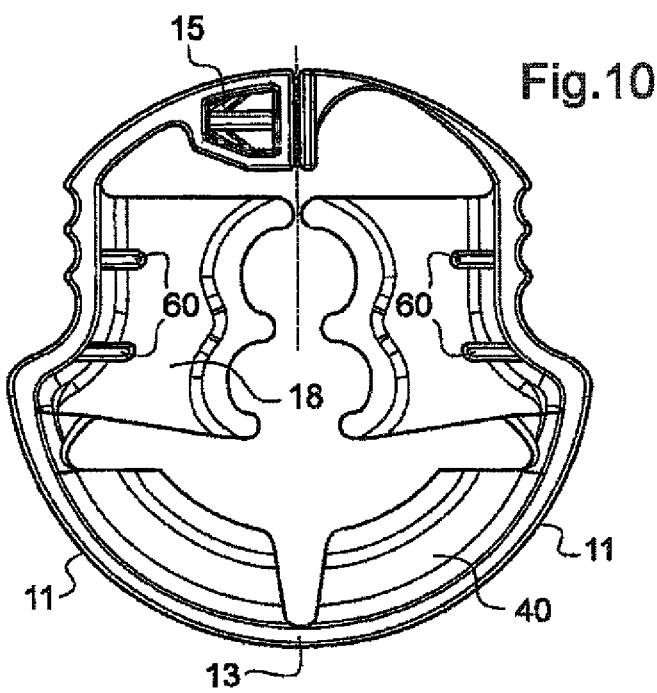

FIGS. 9, 9a, and 10 are respectively views from above and from below of the clip of FIGS. 7 and 8 in the closed position.

The prior art clip shown in FIG. 1 comprises two portions hinged to each other about an axis of rotation R implemented as a film hinge 13. These portions include a closure system remote from the film hinge and rows of teeth that interpenetrate when the clip is closed.

The clip 10 of the invention, as shown in FIGS. 2 to 6, is molded as a single piece of thermoplastic material, e.g. a polyolefin, e.g. polypropylene.

The clip 10 comprises two portions 11 connected together at one end by a film hinge 13, and provided at the other end with a closure system enabling the clip to be closed on the weasand.

In the example described, the closure system comprises a spear 15 on one of the portions and the other portion includes a housing 16 into which the spear can be snap-fastened when the two portions 11 are moved one against the other. The closure system cannot be reopened after the two portions have snap-fastened, given the presence of barbs 15a on the spear 15 that come into abutment against the edge 16a of the housing 16 that faces the other portion.

In addition, the housing 16 and the spear 15 are contained inside a space that is defined by peripheral walls 17 of each of the portions.

The peripheral walls 17 define a major longitudinal dimension L of the clip and a major transverse dimension T of the clip.

L may be of the order of 39 mm and T may be of the order of 38.7 mm, in one embodiment.

The clip has two internal tabs 18 extending obliquely rearwards from the front face 20 of the clip.

The angle with which the tabs 18 extend rearwards relative to a midplane M of the clip is about 45°, for example.

At their rear ends, the tabs 18 present respective returns 19 that extend perpendicularly to the midplane M of the clip, and that have teeth 25 formed thereon.

In the example described, the teeth 25 are connected together by an edge of the return 19 that is concave where it faces towards the other portion.

The teeth 25 are relatively short, their length $l_1$ lying for example in the range 1 mm to 3 mm, and their weight $l_2$ lying in the range 1 mm to 3 mm. The maximum thickness e of the teeth, measured along an axis parallel to the axis R of the hinge lies in the range 0.5 mm to 2 mm, for example.

In the example described, the edge 27 extending between the teeth 25 that are closer to the film hinge 13 is not as wide as the edge 30 situated between the teeth that are further away from the film hinge 13.

Each tab 18 may have three teeth 25, as shown, with the spacing $i_1$ between the teeth 25 further from the hinge 13 being for example about 4 mm and the spacing $i_2$ between the teeth 25 closer thereto being for example about 5 mm.

The gap d between the tips of the facing teeth lies in the range 0 mm to 4 mm, for example.

The tabs 18 and 40, and in particular the teeth 25 and the edges 27 and 30, define an inside space E suitable for receiving the weasand and for avoiding it being expelled towards the closure system when the clip is closed.

Furthermore, an internal partition 16b separates the closure system from the inside space E. This partition may serve to avoid the weasand interfering with the closure system.

The clip 10 also has two tabs 40, each presenting an arcuate shape, the tabs 40 extending from the front face 20 of the clip obliquely rearwards.

The angle of inclination of the tabs 40 relative to the direction the clip slides on the weasand is less than the angle of inclination of the tabs 18 carrying the teeth.

At their rear ends, the tabs 40 include respective returns 42 that extend generally perpendicularly to the hinge axis R and that are directed towards the center region of the clip. Each return 42 defines an arcuate edge that is concave towards the inside space E.

The support tabs 18 and the additional tabs 40 exert thrust in different directions on the clip, namely respectively in the directions represented by arrows $F_1$ and $F_2$.

The support tabs 18 and the additional tabs 40 define between them a space G that takes the shape of a notch.

On their oppositely-directed faces 50, the hinged portions 11 define grip surfaces 51 that may include fluting 52, as shown.

The outside shape of the clip may be free from any portions in relief that project too far so as to reduce any risk of the clip catching on tissue in the vicinity of the weasand.

When observed from above, the clip 10 may present a rounded shape, e.g. with two cylindrical fractions 55 adjacent to the closure system and two other cylindrical fractions 54 adjacent to the hinge.

In the variant embodiment shown in FIGS. 7 to 10, the clip also includes ridges 60 extending transversely to the portions 11 and to the tabs 18 so as to stiffen the tabs. The clip of FIGS. 7 to 10 also differs from the clip of FIGS. 2 to 6 by the fact that the internal partition 16b extends only beside the housing 16 and not beside the spear 15.

The ends of the teeth 19 on the tabs 18 of each of the portions 11 lie on common straight lines, the two straight lines possibly being substantially parallel as shown in FIGS. 2 to 6, or not parallel, as shown in FIGS. 7 to 10. Under such circumstances, they may form between them an angle α, e.g. lying in the range 15° to 25°, e.g. having the value 18.2° in the example shown.

When the clip is closed, the gaps $d_1$, $d_2$, and $d_3$ between pairs of facing teeth may increase on going towards the hinge, as shown in FIG. 9a.

Naturally, the invention is not limited to the examples described above.

For example, it is possible to modify the shapes of the hinge portions and also the shapes of the teeth.

The clip may include a radio frequency identity (RFID) device, or a metal insert, or indeed it may receive a metal compound during molding, in particular by bi-injection.

The cavities 16 may serve to house that device, but depending on the type of device used, it could be placed somewhere else, for example in the form of a wire in the outer portion of the clip.

The expression "comprising a" should be understood as being synonymous with "comprising at least one".

The invention claimed is:

1. A weasand-ligating clip made as a one-piece molding, the clip comprising:
    a film hinge;
    two portions hinged together at a first end by the film hinge, each portion carrying at least one support tab having teeth formed thereon, the teeth configured to clamp against a weasand when the clip is closed, each support tab being inclined at a first angle of inclination relative to a direction the clip slides on the weasand;
    a closure system at a second end of the two portions opposite the first end; and
    at least one additional tab positioned on each portion between the at least one support tab and the film hinge, the at least one additional tab being inclined relative to the direction the clip slides on the weasand at a second angle of inclination that is less than the first angle of inclination.

2. A clip according to claim 1, wherein a major transverse dimension of the clip is greater than 30 mm.

3. A clip according to claim 1, wherein a major transverse dimension of the clip is less than 45 mm.

4. A clip according to claim 1, wherein an aspect ratio of the clip, corresponding to the ratio of a major transverse dimension over its major longitudinal dimension, is greater than 0.6.

5. A clip according to claim 1, wherein the teeth of one portion are situated exactly facing the teeth of the other portion when the clip is closed.

6. A clip according to claim 1, wherein two adjacent teeth of one portion are connected together by an edge that is concave towards the other portion.

7. A clip according to any claim 1, wherein the two portions, when the clip is closed, define an inside space for receiving the weasand.

8. A clip according to claim 1, wherein a space between facing edges of the hinged portions becomes larger on going away from the closure system.

9. A clip according to claim 1, wherein a minimum gap, when the clip is closed, between two teeth belonging respectively to the two portions ranges from 0 mm to 5 mm.

10. A clip according to claim 1, wherein the support tabs extend obliquely rearwards relative to the direction in which the clip slides on the weasand.

11. A clip according to claim 1, further comprising, on each of the portions, a respective additional tab directed obliquely rearwards between the support tab carrying the teeth and the film hinge.

12. A clip according to claim 1, wherein the closure system is disposed inside the clip.

13. A clip according to claim 1, wherein the clip is molded out of a polyolefin.

14. A clip according to claim 13, wherein the polyolefin is polypropylene.

15. A clip according to claim 1, presenting, when observed in front view, and on each of its portions, a respective enlargement above a grip surface of the clip on which the user may place the fingers in order to close the clip.

16. A clip according to claim 15, further comprising a first gap between two first facing teeth that is smaller than a second gap between two second facing teeth, when the clip is closed.

17. A clip according to claim 16, wherein two third facing teeth, other than the first and second teeth defining the first and second gaps, define a third gap that is greater than the first and second gaps.

18. A clip according to claim 1, wherein each portion has at least five teeth facing the other portion.

19. A clip according to claim 1, wherein a major longitudinal dimension of the clip measured from the film hinge to the closure system is less than 45 mm.

20. A method of ligating the weasand of a ruminant, wherein use is made of a clip as defined in claim 1, which clip is closed on the weasand and caused to slide therealong towards the rumen.

* * * * *